United States Patent [19]

Franquinet et al.

[11] Patent Number: 5,204,423
[45] Date of Patent: Apr. 20, 1993

[54] PROCESS FOR THE PREPARATION OF POLYTHIOPHENES BY USE OF FERRIC SALTS AND ALKYL HALIDES

[75] Inventors: Claude Franquinet, Brussels; Etienne Hannecart, Tervuren; Elise Destryker, Sint-Pieters-Leeuw, all of Belgium

[73] Assignee: Solvay & Cie, Brussels, Belgium

[21] Appl. No.: 718,966

[22] Filed: Jun. 21, 1991

Related U.S. Application Data

[63] Continuation of Ser. No. 364,227, Jun. 12, 1989, abandoned.

[30] Foreign Application Priority Data

Jun. 13, 1988 [FR] France .................. 88 07976

[51] Int. Cl.$^5$ ........................... C08F 128/06
[52] U.S. Cl. ................... 526/256; 252/500; 528/403
[58] Field of Search ............ 526/256; 528/403

[56] References Cited

U.S. PATENT DOCUMENTS 4,640,748  2/1987  Wudl et al. ................ 204/59
4,731,311  3/1988  Suzuki ........................ 429/213

FOREIGN PATENT DOCUMENTS 0253594  1/1988  European Pat. Off. .
0350083  1/1990  European Pat. Off. .
1178529  5/1965  Fed. Rep. of Germany .
1000679  8/1965  United Kingdom .

OTHER PUBLICATIONS

Toatsu Chemicals, Inc. Chemical Abstracts, vol. 107, No. 22, Nov. 30, 1987, p. 19, "Synthetic High Polymers", Columbus, Ohio, U.S. No. 199191u, JP-A-62/109,821.

Komatsu K. K., Chemical Patents Index, Basic Abstracts Journal, sec. A: "PLASDOC", No. 87-296,490, Dec. 16, 1987, Derwent Pub. Ltd., London, GB, JP-A-62/209/130.

Mitsui Toatsu Chem., Inc., Patent Abstract of Japan, vol. 11, No. 317 (C-452) [2764] Oct. 15, 1987, "Production of Five-Membered Heterocyclic Compound Polymer", JP-A-62/106,923.

*Primary Examiner*—Christopher Henderson
*Attorney, Agent, or Firm*—Spencer, Frank & Schneider

[57] ABSTRACT

A process for the preparation of a polymer which is electrically conductive and which is based on polythiophene, the process including polymerizing thiophene in a reaction medium including thiophene, from 2.5 to 20 moles of an anhydrous ferric salt per mole of thiophene, from 0.04 to 1 liter of an alkyl halide per gram of thiophene, and from 0.1 to 5% by weight of water introduced into the reaction medium based on the amount of alkyl halide.

8 Claims, No Drawings

PROCESS FOR THE PREPARATION OF POLYTHIOPHENES BY USE OF FERRIC SALTS AND ALKYL HALIDES

CROSS-REFERENCE TO RELATED APPLICATION

This application is a continuation of U.S. patent application Ser. No. 07/364,227 filed Jun. 12th, 1989, now abandoned. The subject matter of this application is closely related to that of copending continuation application Ser. Nos. 07/715,775 and 07/718,967.

BACKGROUND OF THE INVENTION

1. Field of the Invention

The present invention relates to a process for the preparation of electrically conductive polymers based on polythiophenes (also called doped polythiophenes) by chemical polymerization of thiophene.

2. Description of the Related Art

A process for preparing aromatic polymers by chemical polymerization in the presence of a Friedel-Crafts catalyst, such as ferric chloride, at a temperature of between 100° and 800° C., was proposed in Patent DE 1,178,529. The polymers obtained by this process have conductivities of between $10^{-10}$ and $10^{-0.5}$ siemens per cm.

The polymerization of thiophene is usually carried out by an electrochemical route in order to obtain products which are reasonably reproducible.

However, these electrochemical polymerization processes result in polymers which are poorly conductive, thermally unstable and difficult to process. Furthermore, in most cases the degree of conversion of monomer to polymer is low.

SUMMARY OF THE INVENTION

A process for the preparation of polythiophenes by purely chemical polymerization of thiophene has now been found, making it possible to obtain, with a high degree of conversion, homogeneous conductive polymers which have high electrical conductivity properties and satisfactory thermal stability. The polythiophenes thus obtained are easily processed. Furthermore, after processing mixtures of polythiophene and resins such as polyvinyl chloride or polyethylene, the composites obtained exhibit good dispersion and satisfactory mechanical strength.

To this end, the present invention relates to a process for the preparation of electrically conductive polymers based on polythiophenes by chemical polymerization of thiophene in a reaction medium comprising a ferric salt, an alkyl halide and water.

An alkyl halide containing from 1 to 10 carbon atoms is generally used in the reaction medium. Usually, a linear or branched alkyl halide is used, containing from 1 to 8 carbon atoms, the halide being a chloride or a fluoride. A linear alkyl chloride containing from 1 to 4 carbon atoms is preferably used. Particular preference is given to the use of chloroform or methylene chloride.

A ferric salt is used in the reaction medium, as a doping agent which produces the polymerization. An organic or inorganic ferric salt is generally employed. Usually, an inorganic ferric salt is used, such as a chloride, a sulphate or a nitrate. Ferric chloride is preferably used.

The quantity of alkyl halide used in the process according to the invention is generally between 0.04 and 1 liter per g of thiophene, usually between 0.05 and 0.8 liter per g of thiophene and preferably between 0.08 and 0.5 liter per g of thiophene.

The molar ratio of the ferric salt to the thiophene used in the process according to the invention is generally between 2.5 and 20. This ratio is usually between 5 and 15, preferably between 8 and 12.

The quantity of water in the process according to the invention is generally between 0.01 and 5 % by weight of alkyl halide, usually between 0.3 and 4 % and preferably between 0.5 and 3% by weight of alkyl halide.

The reaction is usually conducted under an air or nitrogen atmosphere, and preferably under a nitrogen atmosphere.

The temperature at which the process of the invention is carried out is generally between 0° and 25° C., usually between 2° and 20° C. and preferably between 5 and 15° C. when operating at atmospheric pressure.

The pressure at which the process is carried out is generally between 0.1 and 10 bars and it is preferably equal to atmospheric pressure.

The process according to the invention can advantageously be performed by following the following stages:

during a first stage, a fraction of the necessary quantity of alkyl halide and the ferric salt are introduced into the reactor under a nitrogen atmosphere;

during a second stage, the water and the thiophene, which is dissolved in the necessary quantity of alkyl halide, are added with stirring and a polymer is obtained;

during a third stage, the polymer obtained is washed and then dried.

During the second stage it is particularly advantageous to introduce the water and the thiophene dissolved in the alkyl halide in a continuous and steady manner and in parallel.

During the third stage the polymer obtained is preferably washed with acetonitrile.

The process according to the invention may be carried out in any apparatus or any reactor which makes it possible to combine the operating conditions described above.

The polythiophenes obtained according to the process of the invention can be easily dispersed in various polymeric resins and can be easily processed. In fact, the polythiophenes and their blends with thermoplastic polymers such as espeoially polyvinyl ohloride or polyethylene can be pressure-formed hot to obtain composite plaques or objects. These composite plaques or objects exhibit good mechanical strength and, in contrast to the composite objects produced with polythiophenes obtained by an electrochemical route, have a residual electrical conductivity which is high and stable with time. These composite plaques or objects are homogeneous, because the polythiophenes therein are well dispersed.

The composite plaques or objects can be filled, especially with glass fibres, carbon black, calcium carbonate or metallic particles.

The invention also relates, therefore, to compositions comprising polythiophenes and one or more thermoplastic polymers, as well as electroconductive devices comprising these compositions.

Lastly, the polythiophenes and the compositions comprising polythiophenes obtained according to the process of the invention may be employed for their electrical conductivity, electromagnetic absorption and thermal conductivity properties, and, more particularly, for producing electroconductive devices.

DESCRIPTION OF THE PREFERRED EMBODIMENTS

The invention is illustrated by the following examples.

EXAMPLE 1

A 3-1 round-bottom flask with 5 necks is employed as a reactor; each neck being fitted with, respectively, a 3-way stopcock, a thermometer, a 250-ml storage vessel with a stopcock, supporting a 3-way stopcock, and a septum which makes it possible to insert a needle connected to a 50-ml metering syringe.

This round-bottom flask, equipped with a stirrer, is placed in a thermostatic bath and is purged by a cycle of 3 evacuations and 2 flushes with pure and dry nitrogen.

Into this round-bottom flask, kept at 10° C. under nitrogen, 850 ml of chloroform, previously degassed with nitrogen, are then introduced, and then 185 g of anhydrous ferric chloride are added with stirring.

Next, the metering syringe is filled with 10 ml of demineralized and degassed water and the storage vessel with a stopcock with 150 ml of chloroform and 9.25 g of distilled and degassed thiophene.

The water, the chloroform and the thiophene are then introduced in parallel and over 10 minutes into the round-bottom flask, the water with the aid of the syringe, the chloroform and the thiophene with the aid of the storage vessel with a stopcock.

The round-bottom flask is then again kept at 10° C. for an hour, after which 400 ml of acetonitrile are introduced very slowly over 1 hour into this round-bottom flask, which is kept at 10° C.

Stirring is then carried out for 10 minutes.

The product is then filtered in air at 20° C.

The product obtained is washed 3 times with 300 ml of acetonitrile at 20° C. and is then dried under a dynamic vacuum at 20° C.

15 g of doped polythiophene are finally obtained, exhibiting a conductivity of 45 S cm$^{-1}$ and with a degree of conversion [polymer (polythiophene calculated as undoped)/monomer (thiophene)] of 95 %.

EXAMPLE 2

3 g of polyvinyl chloride (PVC sold under the name Solvic 271 GB K value 71) are blended with 7 g of polythiophene such as obtained in Example 1.

The mixture is introduced into a press where it is subjected to pressure forming at 130° C. for 1 minute under a pressure of one tonne per cm$^2$.

The results are collated in Table 1.

EXAMPLE 3R

For Comparison 10 g of polyvinyl chloride (PVC sold under the name Solvic 271 GB K value 71) are introduced into a press where they are subjected to pressure forming at 130° C. for 1 minute at a pressure of one tonne per cm$^2$.

The results are collated in Table 1.

EXAMPLE 4

10 g of polythiophene such as obtained in Example 1 are introduced into a press where they are subjected to pressure forming at 130° C. for 1 minute under a pressure of one tonne per cm$^2$.

The results are collated in Table 1.

EXAMPLES 5 AND 6

2 g (in the case of Example 5) and 4 g (in the case of Example 6) of polyethylene (PE sold under the name Eltex B 5920 with a density of 0.950 g/cm$^3$ at 20° C. and with an HLMI of 10 g/10 min) are blended with 8 g and 6 g respectively of polythiophene such as obtained in Example 1.

Each blend is introduced into a press where it is subjected to pressure forming at 130° C. for 1 minute under a pressure of one tonne per cm$^2$.

The tablets obtianed have a conductivity of 33 S cm$^{-1}$ in the case of Example 5 and of 20 S cm$^{-1}$ in the case of Example 6.

TABLE 1

| | | | | | Mechanical strength | | |
| | | | | | | Peen speed 1 mm/min | Peen speed 5 mm/min | | |
| | Polythiophene % | Polyvinyl chloride % | Conductivity S cm$^{-1}$ | Apparent flexural elasticity modulus MPa | Flexural stress at break MPa | Maximum deformation at break % | Deflection at break mm |
| --- | --- | --- | --- | --- | --- | --- | --- |
| Example 2 | 70 | 30 | 38 | 4370 | 5170 | 32.8 | 0.7 | 0.7 |
| Example 3R | 0 | 100 | 0 | 2320 | 2130 | 8.5 | 0.5 | 0.4 |
| Example 4 | 100 | 0 | 40 | 2880 | 2990 | 20.4 | 0.9 | 0.9 |

Mechanical strength was measured according to the flexural test standards: NFT 51-001 of September 1972, ISO 178-1975 (F) and ASTM D 790 M-86; these tests were carried out at 23° C. on test specimens 55 mm in length, 15 mm in width and 2 mm in thickness; the distance between the supporting points being fixed at 35 mm.

What is claimed is:

1. A process for the preparation of a polymer which is electrically conductive and which is based on polythiophene, the process comprising:
   polymerizing thiophene in a reaction medium comprised of:
   thiophene,
   from 2.5 to 20 moles of an anhydrous ferric salt per mole of thiophene,
   from 0.04 to 1 liter of an alkyl halide per gram of thiophene, and
   from 0.1 to 5% by weight of water introduced into the reaction medium based on the amount of alkyl halide.

2. The process according to claim 1, wherein the alkyl halide is selected from the group consisting of chloroform and methylene chloride.

3. The process according to claim 1, wherein the anhydrous ferric salt is anhydrous ferric chloride.

4. The process according to claim 1, wherein polymerizing takes place at a temperature ranging from 0° to 25° C.

5. The process according to claim 4, wherein the process further comprises:
   a. introducing into a reactor under a nitrogen atmosphere a fraction of the alkyl halide and the anhydrous ferric salt;
   b. adding to the reactor, after step a and in parallel, and with stirring the water and the thiophene, which thiophene is dissolved in a remaining fraction of the alkyl halide, to obtain a polymer; and
   c. washing and drying the polymer obtained.

6. The process according to claim 5, wherein the polymer obtained is washed with acetonitrile.

7. A chemical polymerization process for the preparation of a doped polythiophene which is electrically conductive, the process comprising:
   a. introducing into a reactor kept at a temperature ranging from 0° to 25° C. and a pressure ranging from 0.1 to 10 bars, a fraction of an alkyl halide containing from 1 to 10 carbon atoms and a ferric salt, with stirring;
   b. adding to the reactor, after step a and in parallel, water and thiophene dissolved in a remaining fraction of the alkyl halide, and stirring for a time effective to polymerize the thiophene; and
   c. recovering polythiophene by filtration, washing the polythiophene with a suitable solvent, and drying the polythiophene,
   wherein from 0.04 to 1 liter of alkyl halide per gram of thiophene, from 2.5 to 20 moles of ferric salt per mole of thiophene, and from 0.01 to 5% by weight of water based on the weight of alkyl halide are employed.

8. The process according to claim 7, wherein the process employs an alkyl halide which has been degassed, a ferric salt which is an anhydrous salt, water which has been demineralized and degassed, and thiophene which has been distilled and degassed, and wherein the reactor is provided with an atmosphere of nitrogen gas, whereby the doped polythiophene prepared has a high electrical conductivity on the order of 45 siemens per cm.

* * * * *